US007202575B2

(12) United States Patent
Endo

(10) Patent No.: US 7,202,575 B2
(45) Date of Patent: Apr. 10, 2007

(54) SEMICONDUCTOR INTEGRATED CIRCUIT DEVICE

(75) Inventor: Nobuyuki Endo, Kanagawa (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 428 days.

(21) Appl. No.: 10/785,181

(22) Filed: Feb. 25, 2004

(65) Prior Publication Data

US 2005/0099742 A1 May 12, 2005

(30) Foreign Application Priority Data

Nov. 12, 2003 (JP) ............................ 2003-382455

(51) Int. Cl.
*H02J 1/00* (2006.01)
*H02J 3/00* (2006.01)

(52) U.S. Cl. .......................................... 307/11; 327/56

(58) Field of Classification Search .................. 307/11; 327/56

See application file for complete search history.

(56) References Cited

U.S. PATENT DOCUMENTS

| | | | | |
|---|---|---|---|---|
| 6,288,613 | B1 * | 9/2001 | Bennett | 330/296 |
| 6,748,572 | B2 | 6/2004 | Fujine | |
| 2004/0008733 | A1 * | 1/2004 | Wedding | 370/518 |

FOREIGN PATENT DOCUMENTS

| | | |
|---|---|---|
| JP | 03-283460 | 12/1991 |
| JP | 05-315544 | 11/1993 |
| JP | 2002-368091 | 12/2002 |
| JP | 2003-124793 | 4/2003 |

* cited by examiner

*Primary Examiner*—Stephen W. Jackson
*Assistant Examiner*—Carlos Amaya
(74) *Attorney, Agent, or Firm*—Rabin & Berdo, P.C.

(57) ABSTRACT

There is disclosed a semiconductor integrated circuit device capable of eliminating an influence of a power voltage drop generated in a circuit disposed in the semiconductor integrated circuit device to inhibit an operation defect or an operation speed decrease of the circuit. In a semiconductor integrated circuit device 10 including a power wiring 18 connected to a power supply (Vdd) via a power terminal 12, a ground wiring 20 connected to a ground (0 V) via a ground terminal 14, and a plurality of circuits 301 to 30*f* connected in parallel with one another between the power wiring 18 and the ground wiring 20, a negative power terminal 16 connected to a negative power supply (−Vdd) is disposed, and a current source 22 is disposed as a current generating section between the negative power terminal 16 and a node Gf on a ground wiring 20 side of the f-th circuit 30*f* disposed in a region most distant from the ground.

7 Claims, 1 Drawing Sheet

SEMICONDUCTOR INTEGRATED CIRCUIT DEVICE

BACKGROUND OF THE INVENTION

1. Field of the Invention

The present invention relates to semiconductor integrated circuit devices such as LSI, particularly to a semiconductor integrated circuit device which inhibits a capability of a circuit from being degraded by a power voltage drop generated in the circuit disposed in the semiconductor integrated circuit device.

This application is counterpart of Japanese patent application, Serial Number 382455/2003, filed Nov. 12, 2003, the subject matter of which is incorporated herein by reference.

2. Description of the Related Art

In recent years, semiconductor integrated circuit devices such as LSI have been asked to have an enlarged scale or multiple functions, and there has been a tendency to complicate the constitution of the semiconductor integrated circuit device and to increase the circuit area. This has resulted in an increase in resistance by drawing around a power wiring and a ground wiring disposed in the semiconductor integrated circuit device, or in a decrease in a power voltage for the purpose of saving power consumption and increasing the speed of the circuit. This has caused a voltage drop in the supply voltage in circuits disposed in positions distant from a power supply, and has caused problems such as defective operation and a decrease in the operation speed of the circuit.

To solve the problems, a method has been used in which supply portions of the power voltage are increased or the supply portions are devised to decrease circuits to be disposed in positions distant from the supply portions or a meshed or thick power wiring is disposed to reduce an effective wiring resistance.

Moreover, as a device which inhibits the voltage drop of the supply voltage in a general circuit disposed in the position distant from the power supply, a semiconductor integrated circuit device has been known which detects an internal power voltage level and an internal ground voltage level of the general circuit disposed in a semiconductor integrated circuit. In the device, the general circuit is controlled so as to compensate for a change of the voltage level of the general circuit by obtained internal power voltage detection signal and internal ground voltage detection signal (e.g., see Japanese Patent Application Laid-Open No. 05-315544).

However, in the method of increasing the power supply portions, input pads need to be increased in order to secure the power supply portions. In the method of devising the shape of the power wiring or thickening the power wiring, there is a problem that a layout area of a power wiring portion increases. In this method, the effective resistance of the power wiring decreases but is not completely eliminated. Therefore, this method cannot sufficiently cope with the reduced voltage or the enlarged scale, and cannot be said to be an actually useful method.

Moreover, the conventional semiconductor integrated circuit device for inhibiting the voltage drop of the supply voltage in the general circuit disposed in the position distant from the power supply has a problem that a circuit for detecting the internal power voltage level and internal ground voltage level is required for each general circuit. Another problem is that the wiring on the semiconductor integrated circuit device is complicated.

SUMMARY OF THE INVENTION

The present invention has been developed to solve the above-described problem, and an object thereof is to provide a semiconductor integrated circuit device capable of eliminating an influence of a power voltage drop generated in a circuit disposed in the semiconductor integrated circuit device to inhibit an operation defect or an operation speed decrease of the circuit.

To achieve the above-described object, according to the present invention, there is provided a first semiconductor integrated circuit device comprising: a power wiring whose one end is connected to a power supply; a ground wiring whose one end is connected to a ground; and a plurality of circuits connected in parallel between the power wiring and the ground wiring. The other end of the ground wiring is connected to a current generating section for generating a predetermined current in a state in which the section is connected to a negative power supply.

That is, the ground wiring of the first semiconductor integrated circuit device is connected to the current generating section. The current generating section generates the predetermined current in the state in which the section is connected to the negative power supply.

Accordingly, a direction of the current flowing through the ground wiring corresponds to that extending to a ground from the negative power supply (current generating section). Potentials in nodes which are points connecting a plurality of circuits to the ground wiring become higher, when the nodes are closer to the ground. On the other hand, the potential in the node closer to the power supply becomes higher even on a power wiring side. Therefore, a potential difference between the power supply and the ground can be secured to hold a sufficient voltage level in each circuit, and the operation defect or the operation speed decrease of the circuit can be inhibited.

According to the present invention, there is provided a second semiconductor integrated circuit device comprising: a power wiring whose one end is connected to a power supply; a ground wiring whose one end is connected to a ground; a plurality of circuits connected in parallel between the power wiring and the ground wiring; and a current generating section whose one end is connected to the other end of the ground wiring to generate a predetermined current in a state in which the other end of the section is connected to a negative power supply.

That is, in the second semiconductor integrated circuit device, the current generating section is disposed in the semiconductor integrated circuit device.

According to the present invention, there is provided a third semiconductor integrated circuit device comprising: a power wiring whose one end is connected to a power supply; a ground wiring whose one end is connected to a ground; a plurality of circuits connected in parallel between the power wiring and the ground wiring; a negative power supply; and a current generating section whose one end is connected to the ground wiring and whose other end is connected to the negative power supply to generate a predetermined current.

That is, in the third semiconductor integrated circuit device, the negative power source and current generating section are disposed in the semiconductor integrated circuit device.

Since the second and third semiconductor integrated circuit devices function in the same manner as in the first semiconductor integrated circuit device of the present invention, the potential difference between the power supply and the ground is secured, the sufficient voltage level can be held in each circuit, and the operation defect or the operation speed decrease of the circuit can be inhibited.

In the first to third semiconductor integrated circuit devices, the current generating section is preferably disposed in a wiring portion most distant from a portion in which a ground potential of the ground wiring is supplied.

It is to be noted that in the first to third semiconductor integrated circuit devices, the current generating section may be either one of a current source and an,operating circuit which consumes a predetermined current to operate. That is, the current generating section may be the current source or the operating circuit which consumes the predetermined current to operate.

For example, the operating circuit which consumes the predetermined current to operate may be a clock generator which outputs a clock signal. Since the clock generator consumes much current, a sufficient voltage level can be held in the plurality of circuits connected in parallel between the power wiring and the ground wiring. The clock generator is preferably connected to a level shifter for converting a level of the outputted clock signal to supply the clock signal to the plurality of circuits.

As described above, according to the present invention, since the ground wiring of the semiconductor integrated circuit device is connected to the current generating section and negative power supply, an effect is produced that an influence of a power voltage drop generated in the circuit disposed in the semiconductor integrated circuit device is eliminated and an operation defect or operation speed decrease of the circuit can be inhibited.

DESCRIPTION OF THE PREFERRED EMBODIMENT

Preferred embodiments of the present invention will hereinafter be described in detail with reference to the accompanying drawings.

First Embodiment

Figure 1:
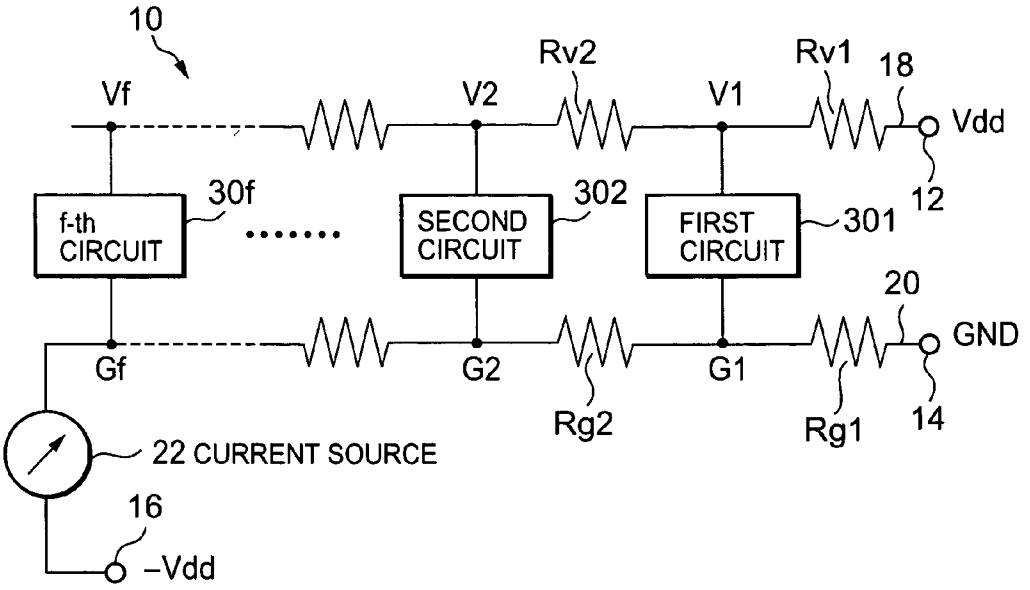
FIG. 1 is a circuit constitution diagram of a semiconductor integrated circuit device according to a first embodiment.

FIG. 1 is a circuit constitution diagram of a semiconductor integrated circuit device according to a first embodiment.

As shown, a power terminal 12, a ground terminal (ground pad) 14, and a negative power terminal 16 are disposed in a semiconductor integrated circuit device 10. The power terminal 12 is connected to an external power supply, and a power voltage (Vdd) is supplied to the power terminal. The ground terminal 14 is connected to a ground (0 V). An external negative power supply is connected to the negative power terminal 16, and a negative power voltage (−Vdd) is supplied to the terminal. In this case, in the present embodiment, the negative power supply is disposed so that a voltage having the same magnitude as that of the voltage between the power supply and the ground is generated between the negative power supply and the ground.

Moreover, the power terminal 12 is connected to a power wiring 18, and the ground terminal 14 is connected to a ground wiring 20. A plurality of circuits including a first circuit 301 to an f-th circuit **30*f* are connected in parallel in order from the circuit closest to the power supply and ground between the power wiring 18 and the ground wiring 20**.

Furthermore, a current source 22 which is a current generating section is disposed between a node Gf and the negative power terminal 16 on the side of the ground wiring 20 in the f-th circuit **30*f* disposed in a region most distant from the ground among the plurality of circuits. That is, the current source 22 is disposed in a wiring portion most distant from the ground terminal (ground pad) 14 for supplying a ground potential (0 V) to the ground wiring 20, and generates a current so that a direction of the current flowing through the ground wiring 20 extends toward the negative power supply (current source 22**) from the ground.

An operation of the semiconductor integrated circuit device 10 will hereinafter be described.

When a current is supplied from the power wiring 18, the current flows into the ground wiring 20 through the respective circuits 301 to **30*f*. At this time, when the current flows through each resistance (hereinafter referred to as the power wiring resistance) disposed in the power wiring 18, a voltage drop is generated. Concretely, assuming that the current flowing through a power wiring resistance Rv1 is Iv1, the voltage drop to a node V1 of the first circuit 301 on the power wiring 18 from the power supply is Rv1×Iv1. Assuming that the current flowing through a power wiring resistance Rv2 is Iv2, the voltage drop to a node V2 of the second circuit 302 from the node V1 is Rv2×Iv2. Therefore, the voltage drop to the node V2 from the power supply is Rv1×Iv1+Rv2×Iv2 which is obtained by integrating the respective voltage drops. Similarly, the voltage drop to the node Vf on the power wiring 18 side of the f-th circuit 30**f from the power supply indicates a value obtained by integrating all the voltage drops in the respective power wiring resistances.

Therefore, as the respective nodes V1, V2, . . . Vf on the power wiring 18 are distant from the power supply, the potentials in the nodes drop.

On the other hand, when the current source 22 connected to the negative power supply is not disposed in the ground wiring 20, the direction of the current flowing through each resistance (hereinafter referred to as the ground wiring resistance) disposed in the ground wiring 20 extends toward the ground from the node Vf of the f-th circuit **30*f* on the ground wiring 20. However, since the current source 22 connected to the negative power supply is connected to the ground wiring 20 here, the direction of the current flowing through each ground wiring resistance extends to the current source 22** from the ground.

Accordingly, the voltage drop is also generated on the ground wiring 20 side. Concretely, assuming that the current flowing through a ground wiring resistance Rg1 is Ig1, and the current flowing through a ground wiring resistance Rg2 is Ig2, the voltage drop of a node G1 of the first circuit on the ground wiring 20 from the ground is Rg1×Ig1, and the voltage drop to a node G2 of the second circuit from the node G1 is Rg2×Ig2. Therefore, the voltage drop to the node G2 from the ground is Rg1×Ig1+Rg2×Ig2 which is obtained by integrating the respective voltage drops. Similarly, the voltage drop to the node Gf from the ground indicates a value obtained by integrating all the voltage drops in the respective ground wiring resistances.

Therefore, all the potentials of the respective nodes G1, G2, . . . Gf on the ground wiring 20 are lower than a ground potential of 0 V, and drop, as the nodes are distant from the ground.

As described above, when the current source 22 connected to the negative power supply is not disposed, the direction of the current flowing through the ground wiring 20 extends to the ground from the node Gf. Therefore, as the node on the ground wiring 20 is distant from the ground (in order of G1, G2, . . . Gf), the potential of the node increases, and becomes highest in the node Gf. As the node on the ground wiring 18 is distant from the power supply (in order of V1, V2, . . . Vf), the potential of the node decreases. As the disposed position of the circuit is distant from the power supply (ground), the potential difference between the node on the power supply side and the node on the ground side in the respective circuits 301 to 30*f* decreases. Especially, the voltage level in the f-th circuit 30*f* disposed farthest from the power supply largely drops as compared with the first circuit 301 disposed in the vicinity of the power supply (ground).

On the other hand, in the present embodiment, since the current source 22 connected to the negative power supply is disposed, the direction of the current flowing through the ground wiring 20 extends to the node Gf from the ground. As the node on the ground wiring 20 is distant from the ground (in order of G1, G2, . . . Gf), the potential of the node lowers, and becomes lowest in the node Gf. As the node on the ground wiring 18 is distant from the ground (in order of V1, V2, . . . Vf), the potential of the node lowers. Therefore, a sufficient potential difference can be secured between the node on the power supply side and the node on the ground side in the respective circuits 301 to 30*f*, and the voltage level does not drop even in the circuit disposed in a position distant from the power supply (ground). The circuit is stabilized to such an extent that the circuit is not influenced by the power voltage drop or the ground voltage rise.

It is to be noted that an example in which the negative power supply is disposed outside the semiconductor integrated circuit device has been described in the present embodiment, but the negative power supply may also be built in the semiconductor integrated circuit device.

Moreover, in the present embodiment, the semiconductor integrated circuit device in which the current source is built has been described as an example, but the current source may also be disposed outside the semiconductor integrated circuit device.

Second Embodiment

In the first embodiment, the example in which the current source 22 is disposed as the current generating section in the semiconductor integrated circuit device 10 has been described. In a second embodiment, an example in which an operating circuit actually consuming the current to operate is disposed instead of the current source 22 will be described. It is to be noted that a constitution similar to that of the first embodiment is denoted with the same reference numerals, and the description thereof is omitted.

Figure 2:
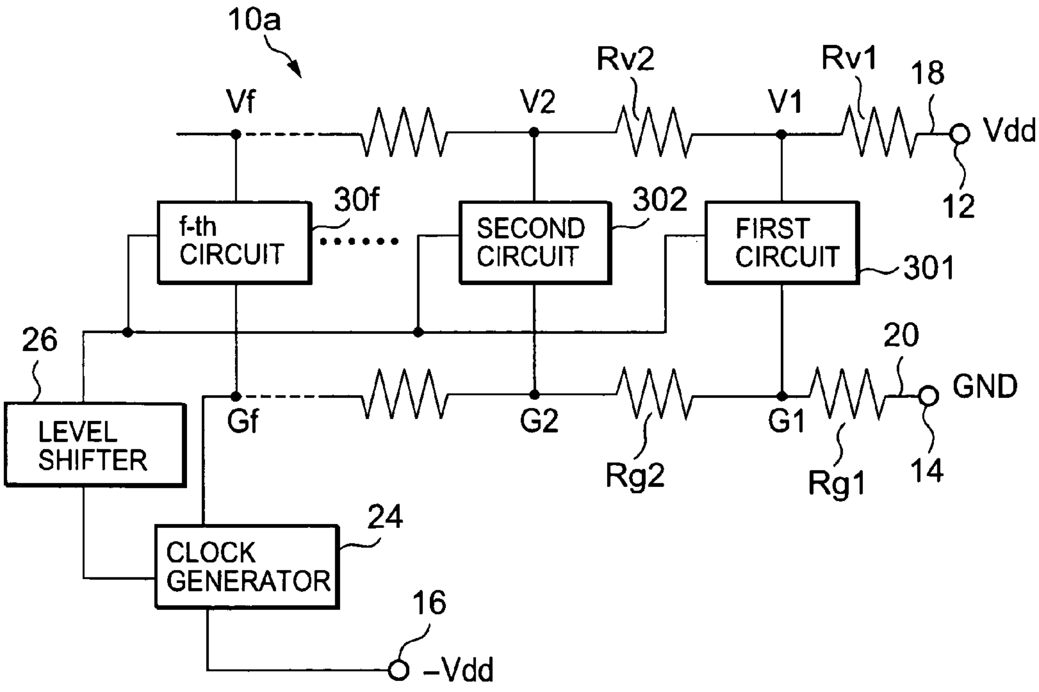
FIG. 2 is a circuit constitution diagram of the semiconductor integrated circuit device according to a second embodiment.

FIG. 2 is a circuit constitution diagram of a semiconductor integrated circuit device 10*a* according to the present embodiment.

As shown, an operating circuit is disposed as the current generating section between the node Gf on the ground wiring 20 side and the negative power terminal 16 of the f-th circuit 30*f* disposed in the region most distant from the ground among a plurality of circuits. It is to be noted that the operating circuit disposed as the current generating section is preferably constituted of a circuit which consumes much current, and a clock generator 24 is used here. After a signal level of an output signal generated by the clock generator 24 is adjusted by a level shifter 26, the signal is outputted to the respective circuits 301 to 30*f* disposed between the power supply and the ground, and is used as a synchronous signal or the like in the circuits 301 to 30*f*.

In the present embodiment, since the clock generator 24 connected to the negative power supply is connected to the ground wiring 20, the direction of the current flowing through each ground wiring resistance extends toward the clock generator 24 from the ground. Therefore, in the same manner as in the first embodiment, as the node on the ground wiring 20 is distant from the ground (in order of G1, G2, . . . Gf), the potential of the node lowers. As the node on the ground wiring 18 is distant from the power source (in order of V1, V2, . . . Vf), the potential of the node lowers. Therefore, the sufficient potential difference can be secured between the node on the power supply side and the node on the ground side in the respective circuits 301 to 30*f*, and the voltage level does not drop even in the circuit disposed in the position distant from the power supply (ground). The circuit is stabilized to such an extent that the circuit is not influenced by the power voltage drop or the ground voltage rise.

Moreover, in the present embodiment, since the current flowing toward the negative power supply from the ground is also used for the circuit operation of the clock generator 24, a current supply amount in the whole circuit may be reduced. Furthermore, since the clock generator 24 is disposed as the current generating section, a layout area can be reduced as compared with a case where the current source 22 is disposed.

It is to be noted that an example in which the negative power supply is disposed outside the semiconductor integrated circuit device has been described in the present embodiment, but the negative power supply may also be built in the semiconductor integrated circuit device.

Moreover, in the present embodiment, the semiconductor integrated circuit device in which the operating circuit (clock generator) is built has been described as the example, but the operating circuit may also be disposed outside the semiconductor integrated circuit device.

It is to be noted that the present invention is not limited to the semiconductor integrated circuit device described as the example in the first and second embodiments, and can be applied to various semiconductor integrated circuit devices.

What is claimed is:

1. A semiconductor integrated circuit device comprising:

a power wiring having a first terminal connected to a first power supply of a first polarity;

a ground wiring distinct from said power wiring, and having a first terminal connected to a ground; and a plurality of circuits connected in parallel between the power wiring and the ground wiring, wherein the ground wiring has a second terminal connected to a current generating section for generating a predetermined current in said ground wiring in a state in which the current generating section is connected to a second power supply of a second polarity opposite to said first polarity.

2. A semiconductor integrated circuit device comprising:

a power wiring having a first terminal connected to a first power supply of a first polarity;

a ground wiring distinct from said power wiring, having a first terminal connected to a ground and having a second terminal;

a plurality of circuits connected in parallel between the power wiring and the ground wiring; and a current generating section having a first terminal connected to the second terminal of the ground wiring to generate a predetermined current in said ground wiring in a state in which a second terminal of the current generating section is connected to a second power supply of a second polarity opposite to said first polarity.

3. A semiconductor integrated circuit device comprising:

a power wiring having a first terminal connected to a first power supply of a first polarity;

a ground wiring distinct from said power wiring, and having a first terminal connected to a ground;

a plurality of circuits connected in parallel between the power wiring and the ground wiring;

a second power supply of a second polarity opposite to said first polarity; and a current generating section having a first terminal connected to the ground wiring and having a second terminal connected to the second power supply to generate a predetermined current in said ground wiring.

4. The semiconductor integrated circuit device according to claim 1, wherein the second terminal of said ground wiring connected to said current generating section is disposed in a second portion of said ground wiring most distant from a first portion of said ground wiring in which a ground potential is supplied to the ground wiring via said first terminal of said ground wiring.

5. The semiconductor integrated circuit device according to claim 1, wherein the current generating section is either one of a current source or an operating circuit which consumes a predetermined current to operate.

6. The semiconductor integrated circuit device according to claim 5, wherein the operating circuit which consumes the predetermined current to operate is a clock generator which outputs a clock signal.

7. The semiconductor integrated circuit device according to claim 6, wherein the clock generator is connected to a level shifter for converting a level of the outputted clock signal to supply the clock signal to the plurality of circuits.

* * * * *